(12) United States Patent
Selekman et al.

(10) Patent No.: US 10,771,423 B2
(45) Date of Patent: Sep. 8, 2020

(54) SYSTEMS AND METHODS TO CONTROL EVENT BASED INFORMATION

(71) Applicant: Facebook, Inc., Menlo Park, CA (US)

(72) Inventors: Aryeh Selekman, San Francisco, CA (US); Diana Hsu, San Francisco, CA (US); Yuval Kesten, Palo Alto, CA (US); Alexander James Himel, San Francisco, CA (US); Daniel S. Chai, Los Altos Hills, CA (US); Ray C. He, Menlo Park, CA (US); David Kao, Fremont, CA (US); Justin David Stahl, San Francisco, CA (US); Markus Christian Messner-Chaney, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 527 days.

(21) Appl. No.: 14/951,382

(22) Filed: Nov. 24, 2015

(65) Prior Publication Data

US 2017/0149852 A1     May 25, 2017

(51) Int. Cl.
*H04L 29/06*     (2006.01)
*H04L 12/58*     (2006.01)
*H04L 29/08*     (2006.01)
*G06Q 50/00*     (2012.01)

(52) U.S. Cl.
CPC ............ *H04L 51/32* (2013.01); *G06Q 50/00* (2013.01); *H04L 67/22* (2013.01); *H04L 67/306* (2013.01)

(58) Field of Classification Search
CPC ..... H04L 65/403; H04L 51/32; H04L 67/306; H04L 67/22
See application file for complete search history.

(56) References Cited

U.S. PATENT DOCUMENTS

| | | | | |
|---|---|---|---|---|
| 9,440,152 | B2* | 9/2016 | Thompson | A63F 13/35 |
| 2011/0016014 | A1* | 1/2011 | Tonnison | G06Q 30/02 |
| | | | | 705/26.2 |
| 2011/0093784 | A1* | 4/2011 | Kiraz | G06F 3/04842 |
| | | | | 715/719 |
| 2011/0154223 | A1* | 6/2011 | Whitnah | G06Q 10/10 |
| | | | | 715/753 |
| 2012/0259924 | A1* | 10/2012 | Patil | H04L 65/4076 |
| | | | | 709/206 |
| 2012/0265758 | A1* | 10/2012 | Han | G06Q 50/10 |
| | | | | 707/737 |
| 2012/0278387 | A1* | 11/2012 | Garcia | G06Q 50/01 |
| | | | | 709/204 |
| 2013/0066750 | A1* | 3/2013 | Siddique | G06Q 10/0637 |
| | | | | 705/27.2 |
| 2013/0198655 | A1* | 8/2013 | Whitnah | G06Q 10/10 |
| | | | | 715/753 |

(Continued)

*Primary Examiner* — Philip J Chea
*Assistant Examiner* — Wuji Chen
(74) *Attorney, Agent, or Firm* — Sheppard Mullin Richter & Hampton LLP

(57) ABSTRACT

Systems, methods, and non-transitory computer readable media are configured to provide content items, generated by at least one of connections or a group of a user, relating to an event for presentation on a page of a social networking system dedicated to the event. A live feed of information relating to the event is provided for presentation on the page. A summary of segments of the event is provided for presentation on the page.

20 Claims, 8 Drawing Sheets

(56) References Cited

U.S. PATENT DOCUMENTS

| | | | |
|---|---|---|---|
| 2014/0012895 A1* | 1/2014 | Lieberman | H04L 67/02 709/203 |
| 2014/0040414 A1* | 2/2014 | Ronchi | H04L 65/60 709/213 |
| 2015/0121436 A1* | 4/2015 | Rango | G11B 27/10 725/88 |
| 2016/0275167 A1* | 9/2016 | Scherpa | G06F 16/284 |
| 2017/0124061 A1* | 5/2017 | Amerige | G06F 17/2247 |

* cited by examiner

550

```
┌─────────────────────────────────────────────────────────────────────┐
│ Provide content items, generated by at least one of connections or a group of a │
│ user, relating to an event for presentation on a page of a social networking │
│                    system dedicated to the event                    │
│                                 552                                 │
└─────────────────────────────────────────────────────────────────────┘
                                  │
                                  ▼
┌─────────────────────────────────────────────────────────────────────┐
│  Provide a plurality of options to the user to personalize a post of the user to  │
│ indicate an expression of support by the user for at least one aspect of the event │
│                                 554                                 │
└─────────────────────────────────────────────────────────────────────┘
                                  │
                                  ▼
┌─────────────────────────────────────────────────────────────────────┐
│ Pre-populate information in a post of the user regarding an activity of the user in │
│                        relation to the event                        │
│                                 556                                 │
└─────────────────────────────────────────────────────────────────────┘
                                  │
                                  ▼
┌─────────────────────────────────────────────────────────────────────┐
│ Append a reference to a post of the user related to the event indicating at least │
│ one of a time of the event and an activity of the event that is contemporaneous │
│                      with generation of the post                    │
│                                 558                                 │
└─────────────────────────────────────────────────────────────────────┘
```

FIGURE 5A

SYSTEMS AND METHODS TO CONTROL EVENT BASED INFORMATION

FIELD OF THE INVENTION

The present technology relates to the field of content provision. More particularly, the present technology relates to techniques for controlling provision of event related content originating from disparate sources.

BACKGROUND

Today, people often utilize computing devices for a wide variety of purposes. Users can use their computing devices, for example, to communicate and otherwise interact with other users. Such interactions are increasingly popular over a social network.

Some interactions in a social network may include the sharing of content. Content items can include, for example, a narrative or an image posted by a user, descriptions of activities of connections of the user, articles regarding subject matter of interest to the user, advertisements directed to the user, etc. When a popular event takes place in real life or on a platform provided by a social networking system, substantial amounts of information, including relevant content items, regarding the event can be potentially generated within the social networking system. As an event grows in prominence, the extent of the information relating to the event and the number of sources of such information also grow within the social networking system.

SUMMARY

Various embodiments of the present disclosure can include systems, methods, and non-transitory computer readable media configured to provide content items, generated by at least one of connections or a group of a user, relating to an event for presentation on a page of a social networking system dedicated to the event. A live feed of information relating to the event is provided for presentation on the page. A summary of segments of the event is provided for presentation on the page.

In an embodiment, the event relates to at least one of a sports activity, an entertainment activity, a political activity, and a social activity.

In an embodiment, the event occurs in at least one of real life or the social networking system.

In an embodiment, content items generated by participants in the event are provided for presentation on the page.

In an embodiment, live data of the live feed is received from a third party source in communication with the social networking system.

In an embodiment, a plurality of options are provided to the user to personalize a post of the user to indicate an expression of support by the user for at least one aspect of the event.

In an embodiment, information is pre-populated in a post of the user regarding an activity of the user in relation to the event.

In an embodiment, a reference is appended to a post of the user related to the event indicating at least one of a time of the event and an activity of the event that is contemporaneous with generation of the post.

In an embodiment, each image of a plurality of images is associated with a corresponding activity of the event. Each image of the plurality of images is presented contemporaneously with the occurrence of each activity of the event as the event transpires.

In an embodiment, the plurality of images is selected by at least one of an administrator of the social networking system and an organization that manages the event.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5A illustrates a second method to manage a page associated with an event, according to an embodiment of the present disclosure.

Figure 1:
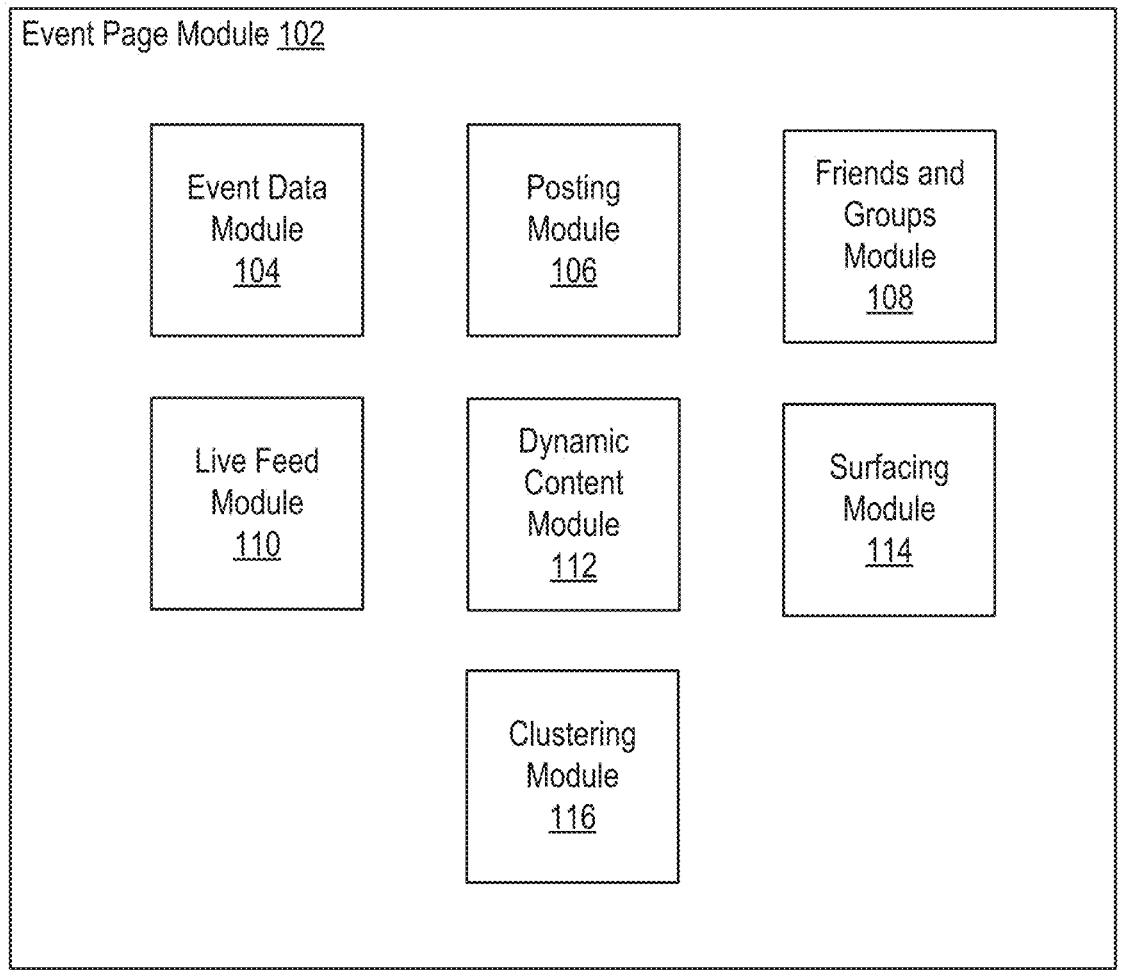
FIG. 1 illustrates a system including an example event page module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Managing a Page Associated with an Event

As mentioned, some interactions in a social network may include the sharing of content. Content items can include, for example, a narrative or an image posted by a user, descriptions of activities of connections of the user, articles regarding subject matter of interest to the user, advertisements directed to the user, etc. When a popular event takes place in real life or on a platform provided by a social networking system, substantial amounts of information, including content items, regarding the event can be potentially generated within the social networking system.

As an event grows in prominence, the extent of the information relating to the event and the number of sources of such information also grow within the social networking system. For example, users may provide more amounts of information about an event in which they have strong interest. As another example, the number of users that provide information about the event may increase when the event has popular appeal to a relevant community on the social networking system. When a significant amount of information regarding an event is maintained by the social networking system, it can be challenging for the information to be identified, organized, and presented in a manner that benefits an interested user audience for the information. The challenge can be exacerbated when the number of sources of the information is large.

An improved approach rooted in computer technology to manage information relating to an event on a social networking system overcomes these and other disadvantages associated with conventional approaches implemented in computer technology. Systems, methods, and computer readable media of the present technology can manage information associated with the event. Event data can be received, maintained, organized, and presented on a page of a social networking system. The event data can include, for example, live data about the event, sequenced summaries of segments of the event as the event proceeds, data provided by participants who are directly or indirectly associated with the event itself, and images that are associated with the event. In some instances, the event data can be presented in real time (or near real time). When a user of the social networking system desires to post information about the event on the page through a composer, identifying or other relevant information about the event can be automatically pre-populated in the content for the post. In addition, a content item (or story) about the event can be generated so that an event reference is included or appended to the content item to indicate a relationship between the content item and an associated time or occurrence of the event. Other content items relating to the event involving friends of the user or groups to which the user belongs can be identified and presented through the page. A live feed relating to the event, which can include trending stories about the event presented in real time (or near real time), also can be organized and presented through the page. The user also can be presented with options to personalize her identify by selecting an icon or other symbol to express her support of the event or a particular aspect of the event. The icon can appear in content items about the event that are generated by the user. To provide access to and promotion of the page, a link to the page can be prominently published or otherwise surfaced to users on the social networking system who have been determined to have an interest in the event. Users who interact with the page can be relationally associated with one another to form a cluster of users to which advertisers may target advertising based on common user interest in the event.

An event can be any type of occurrence or activity. For example, an event can be a sports game (e.g., Super Bowl), an entertainment spectacle (e.g., the Oscars), a political (e.g., White House inauguration) or social (e.g., Papal visit) occurrence, etc. An event can be associated with a large audience or a small audience. An event can occur in real life or before a community of interested users on a communications platform, such as a social networking system, or both. Although some of the examples discussed herein may relate to certain events, such as a sports game or an entertainment awards ceremony, the present technology can be implemented for any and all suitable types of other events. More details regarding the present technology are discussed herein.

FIG. 1 illustrates an example system 100 including an example event page module 102 configured to allow selective management of information associated with an event, according to an embodiment of the present disclosure. In some embodiments, the event page module 102 can be implemented as an interactive page of a social networking system associated with an event through which a user of the social networking system can provide and receive information associated with the event. The page can present relevant information associated with the event that is maintained or received by the social networking system. The information associated with the event can be provided (e.g., created, uploaded, shared, communicated, transmitted, etc.), for example, by a user to the social networking system, connections of the user on the social networking system, others in the social networking system, or a third party computer system in communication with the social networking system.

The event page module 102 can include an event data module 104, a posting module 106, a friends and groups module 108, a live feed module 110, a dynamic content module 112, a surfacing module 114, and a clustering module 116. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the event page module 102 can be implemented in any suitable combinations.

The event data module 104 can receive and provide various types of information associated with an event. The event data module 104 can receive and present information in real time (or near real time) about the event itself as the event transpires. The event data module 104 also can receive and provide summaries or other descriptions of segments of the event. The event data module 104 also can receive and provide information from or about participants directly or indirectly involved in the event. The event data module 104 also can receive and provide images or other content that is reflective or representative of the event in general or certain segments of or occurrences in the event. The information managed by the event data module 104 can be presented on the page of a social networking system associated with the event. The event data module 104 is discussed in more detail herein.

The posting module 106 can allow a user to provide information about an event so that the information is related to the page on the social networking system associated with the event. When a user intends to publish a content item about the event (e.g., a story), the posting module 106 can automatically facilitate association of the content item with the page associated with the event so that the content item can be presented on the page. In addition, the posting module 106 can provide an event reference for the content item to signify a relationship between the content item and an associated time or occurrence of the event. The posting module 106 is discussed in more detail herein.

The friends and groups module 108 can receive and provide information about an event from connections of a user in the social networking system and from groups in the social networking system to which the user may belong. For example, when the event is a sports game (e.g., Super Bowl), the friends and groups module 108 can provide content items associated with the sports game from friends of a user and groups of the user. As another example, when the event is an entertainment awards ceremony (e.g., the Oscars), the friends and groups module 108 can provide content items associated with the entertainment awards ceremony from friends of a user and groups of the user. The friends and groups module 108 can identify the connections of the user and further identify content items provided to the social networking system by the connections that relate to the event. The friends and groups module 108 also can identify the groups to which the user belongs and further identify content items provided to the social networking system by an administrator of the group or group members that relate to the event. The content items can include, for example, posts made by the connections, group administrators, or group members that relate to the event. The identification of such content items can be performed in a variety of manners, such as text analysis techniques, image recognition techniques, and other content and contextual analysis techniques applied to the content items.

After the content items are identified, the friends and groups module 108 can sort and rank the content items for potential presentation to the user. For example, the content items can be sorted based on one or more of a variety of factors or values, such as an affinity between a connection who generated a content item and the user, an affinity between a group who generated a content item and the user, a measure or value reflecting the extent to which the content item is associated with the event, a timestamp of the content item in relation to the event or a specific occurrence of the event, the number of likes of a content item, etc. In some embodiments, a selected number of content items having the highest values or content items associated with values that satisfy a threshold value can be selected for presentation to the user in the page of the social networking system associated with the event. The content items selected for presentation can be displayed in a portion of the page reserved for content items associated with the event that were generated by connections and groups of the user.

The live feed module 110 can present an ordered sequence of content items that are associated with the event and generated by users in the social networking system in general. In some embodiments, these users are not connections of the user or groups to which the user belongs. The live feed module 110 can provide in real time (or near real time) for potential presentation content items that reflect the contemporaneous thoughts and reactions of users in relation to the event as the event transpires. The live feed module 110 can select for potential presentation to a user content items associated with the event with public privacy settings so that the content items are accessible to the user.

The live feed module 110 can constitute functionality to implement a trending news experience related to the event. The live feed module 110 can collect a variety of content items associated with the event. For example, when the event is a sports game, the live feed module 110, can provide a trending news experience that captures the most important, relevant, or timely content items and associated metadata about the sports game from a variety of sources. In some embodiments, the content items, or metadata about the content items, can be organized into a variety of categories and presented by category to a user with an interest in the event who visits the associated page on the social networking system. The categories can be associated with, for example, authorities (e.g., journalists), conversations of eyewitnesses, eyewitness media, metadata, etc. The category relating to authorities can include content items by entities that by virtue of their identity are authoritative regarding the event. The category relating to conversations of eyewitnesses can include content items of persons who are eyewitnesses to the event. The content items of the eyewitnesses can include content items that reflect subject matter relating to the event. The category relating to eyewitness media can include content items that are created contemporaneously in real time (or near real time) as the event transpires, such as images, video, and audio that are live with respect to the event. The category relating to metadata can include various attributes, statistics, or timelines based on the event itself or content items related to the event.

The organization and presentation of content items and metadata by the live feed module 110 can provide to users information regarding the event that is both relevant and timely (e.g., live). The live feed module 110 can present the categories of content items to the user in some embodiments. When presented to the user, the categories of content items can provide multidimensional, comprehensive information about and perspectives on the event. The content items can be organized and presented in a variety of manners. In some embodiments, the content items selected for presentation can be displayed in a portion of the page reserved for the content items selected for presentation by the live feed module 110.

The dynamic content module 112 can tailor presentation of information on the page of a social networking system associated with an event based on preferences of a user interacting with the page. In some embodiments, the dynamic content module 112 can provide an interface to personalize the identity of the user on the page by user selection of icons to indicate support of the user in the event or an aspect of the event. For example, if the event is a sports game, the dynamic content module 112 can allow the user to select from a menu of icons to publish the loyalty of the user in relation to teams participating in the sports game. The menu of icons can include a symbol, logo, or other identifier (e.g., team mascot, team identifier, team flag, team banner, etc.) associated with each team in the sports game. The identifier can be displayed in the color of the team that the user supports, to name another example. In some embodiments, the menu of icons can include icons that can allow the user to reflect his or her interest or enthusiasm in the event in general. For example, when the event is a football game, a football icon can be an icon in the menu to allow the user to convey interest or enthusiasm of the user in football, to name an example. When a content item or sentiment generated by the user appears on the page, the content item or sentiment can include display of the icons selected by the user.

The dynamic content module 112 also can tailor the presentation of information about an event on a page of the social networking system based on attributes of the event. For example, a portion of the page can be dedicated to providing summaries of segments of the event, as described in more detail herein. In the case of a sports game, the dynamic content module 112 can provide a "play-by-play" (or the like) area. In the case of an entertainment awards ceremony, the dynamic content module 112 can provide an "award winners by category" (or the like) area. As another example, another portion of the page can be dedicated to providing an up-to-date status of the event. For a sports game, the dynamic content module 112 can provide a "scoreboard" (or the like) area to present the current score of the sports game. For an entertainment awards ceremony, the dynamic content module 112 can provide an "award winner" (or like) area that displays the last declared award winner during the ceremony. There can be many variations.

The surfacing module 114 can manage access to the page on the social networking system associated with an event. The surfacing module 114 can determine potential interest in the page by a user based on a profile of the user and interactions of the user on the social networking system. When the user is on other pages of the social networking system, the surfacing module 114 can display, for example, a prominent banner or notification to users who may be interested in interacting with the page associated with the event. The notification can be an announcement that is presented to user. The notification can appear in a variety of places, such as an initial screen displayed to a user upon launch of a website or native application of the social networking system. To generate interest in the page associated with the event to the user, the notification can include, for example, a summary of actions taken by connections of the user in relation to the page. Upon selection of the notification, the user may be directed to the page associated with the event.

The clustering module 116 can identify a group of users who are interacting with the page on the social networking system associated with an event. The clustering module 116 can identify in real time (or near real time) users who are currently interacting with the page, for example, by visiting the page, posting to the page, liking content items displayed on the page, sharing content items displayed on the page, etc. In some embodiments, a threshold amount of time can be determined such that any interactions of a user that occurred before a current time plus the threshold amount of time are determined to be current interactions. In some embodiments, a group of such users can be identified as a cluster so that advertisers can provide immediate targeted advertising for the cluster of users based on their demonstrated, contemporaneous interest in the event.

In some embodiments, the event page module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the event page module 102 can be, in part or in whole, implemented as software running on one or more computing devices or systems, such as on a server or a client computing device. For example, the event page module 102 can be implemented as or within a dedicated application (e.g., app), a program, or an applet running on a user computing device or client computing system. In some instances, the event page module 102 can be, in part or in whole, implemented within or configured to operate in conjunction or be integrated with a social networking system (or service), such as a social networking system 630 of FIG. 6. Likewise, in some instances, the event page module 102 can be, in part or in whole, implemented within or configured to operate in conjunction or be integrated with client computing device, such as a user device 610 of FIG. 6. It should be understood that many variations are possible.

The data store 118 can be configured to store and maintain various types of data, such as the data relating to support of and operation of the event page module 102. The data can include data relating to, for example, a page associated with an event, content items related to the event, summaries of segments of the event, labels based on the type of the event, threshold values, event data associated with the event, friends and groups of a user interacting with the page, a cluster of users currently interacting with the page, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the event page module 102 can be configured to communicate and/or operate with the data store 118.

Figure 2:
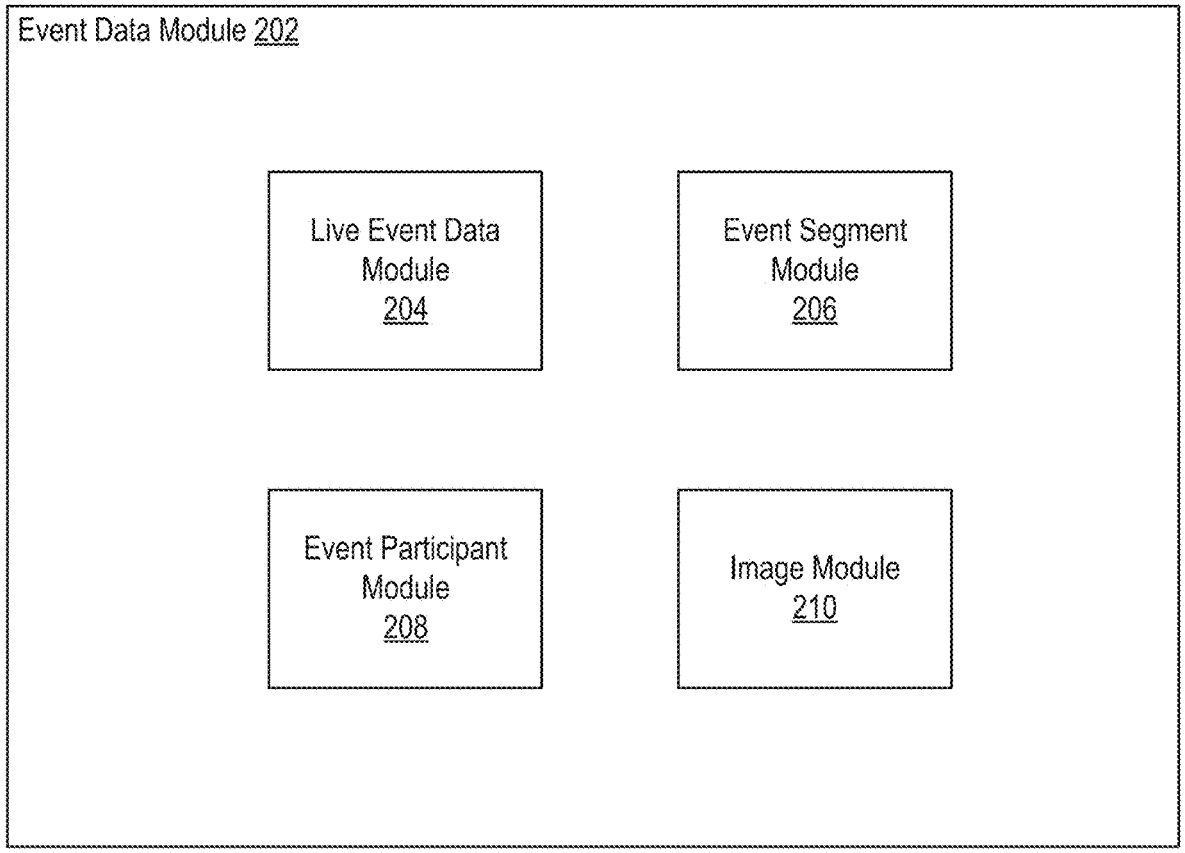
FIG. 2 illustrates an example event data module, according to an embodiment of the present disclosure.

FIG. 2 illustrates an example event data module 202, according to an embodiment of the present disclosure. In some embodiments, the event data module 104 of FIG. 1 can be implemented with the event data module 202. As shown in the example of FIG. 2, the event data module 202 can include a live event data module 204, an event segment module 206, an event participant module 208, and an image module 210.

The live event data module 204 can provide live information in real time (or near real time) about the event itself as the event transpires for presentation on the page of the social networking system associated with the event. For example, when the event is a sports game, the live event data module 204 can provide game information, such as score information, team status information, penalty information, weather information, etc. As another example, when the event is an entertainment awards ceremony, the live event data module 204 can provide nominee information, winner information, speech information, etc. In some embodiments, the live event data module 204 can be linked to a data source (e.g., feed) of live information about the event as the event transpires. The data source can be maintained by a third party organization that is different from the organization that operates the social networking system.

The event segment module 206 can provide summaries of segments of the event for presentation on a page of the social networking system associated with the event. Segments can include, for example, portions of the event defined by intervals of time or defined by the occurrence of certain activities. In the example of a sports game, the event segment module 206 can provide, for example, a score summary after each interval of play in the game (e.g., a quarter, a period, etc.). Other summaries (e.g., injury summary, penalty summary, offense summary, defense summary, etc.) also can be provided. In the example of an entertainment awards ceremony, the event segment module 206 can provide, for example, a summary of award nominees, award winners, award losers after each TV commercial break, each presentation of an award, etc. The summaries can be presented in a dedicated portion of the page.

The event participant module 208 can provide information regarding participants directly or indirectly related to the event for presentation on the page of the social networking system associated with the event. Participants can include persons or other entities that are related to the event. For example, with respect to a sports game, participants can include players, coaches, teams, etc. In this example, to qualify the players, coaches, and teams as participants, the association of players and coaches with a team can be facilitated by mapping data that can be provided by a third party source. As another example, with respect to an entertainment awards ceremony, participants can include hosts, presenters, award nominees, award winners, etc. Information related to participants that is related to the event can be collected by the event participant module 208 and presented on the page. Such information can include content items generated by the participants themselves or content items that reference the participants. The content items can be generated before, during, or after the event. For example, a content item can include a newspaper article about a player and his preparations for the sports game associated with the page. As another example, a content item can include a post during an entertainment awards ceremony by an actor who is commenting on the long duration of acceptance speeches given during the ceremony or a post by the actor at an after party for the ceremony regarding the prominence of guests in attendance.

The image module 210 can change the content displayed on a page associated with an event. In some embodiments, a cover image or other content item representing or related to the event and published on the page can change or update during the event as the event transpires. The page can sequentially display various content items, such as a plurality of images (or video), that are ordered in a manner that reflects activities of the event itself as the event transpires. For example, if the event is a sports game, various images of the sports game can be displayed on the page. The images can include, for example, highlights or significant occurrences of the sports game sequenced and timed in a manner that reflects the progress of the sports game. As another example, if the event is an entertainment awards ceremony, various images of the entertainment awards ceremony can be sequentially displayed on the page so that they reflect contemporaneous activities of the ceremony as the ceremony proceeds.

In some embodiments, an organization that manages or sponsors the event can select images or other content to present on the page. The organization also can select an order and timing of presentation of such content. In some embodiments, the selection can be determined prior to the event or the selection can be determined as the event transpires. In some circumstances, the organization and an administrator of the social networking system can collaborate to perform the selection of images to optimize the page for the benefit of users who will interact with the page.

Figure 3:
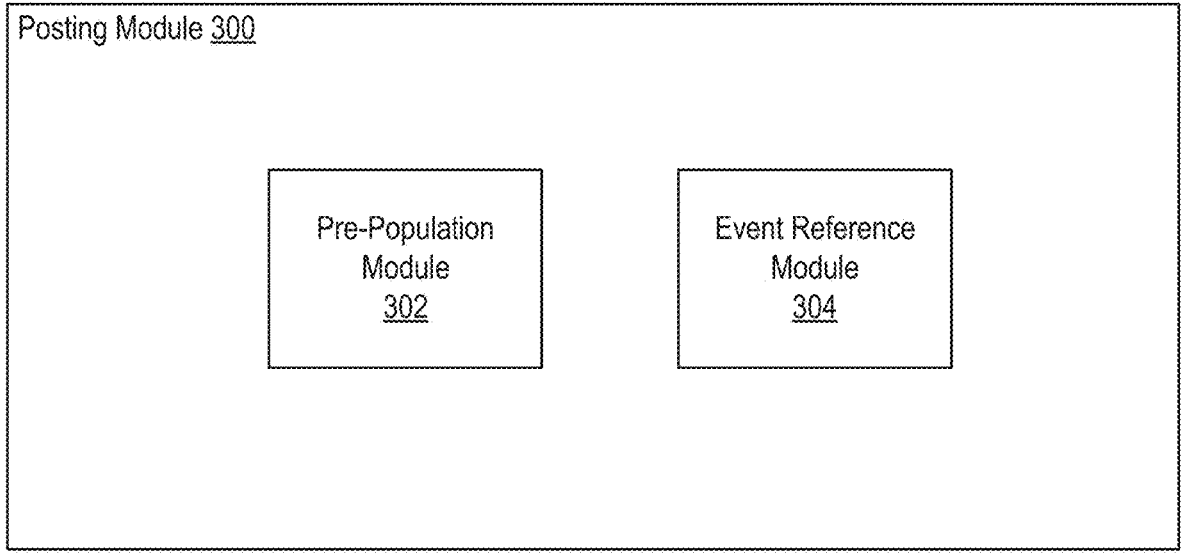
FIG. 3 illustrates an example posting module in accordance with a control mode, according to an embodiment of the present disclosure.

FIG. 3 illustrates an example posting module 300, according to an embodiment of the present disclosure. In some embodiments, the posting module 106 of FIG. 1 can be implemented with the posting module 300. As shown in the example of FIG. 3, the posting module 300 can include a pre-population module 302 and an event reference module 304. The posting module 300 can modify or supplement a post to the page of the social networking system associated with an event before the post is published on the page.

The pre-population module 302 can automatically add information to a post to the page before the post is published on the page. For example, when a user creates a post, such as a content item reflecting thoughts or sentiments of the user, that relates to the event, the pre-population module 302 can automatically include information in the post that references the action or sentiment of the user in relation to the event. For example, if a user intends to create a post to express excitement regarding the event, the pre-population module 302 can automatically insert in the post a statement that the user is watching the event. The insertion of such a statement can simplify the effort of the user in creating a descriptive post that other users who access the post will find informative. The insertion of such a statement also can facilitate classification of the post by the social networking system so that the post appears in a relevant context when presented.

The event reference module 304 can create a reference that relates generation of a content item to a contemporaneous time or activity associated with the event. The reference can provide context to the content item in relation to the event as the event transpires. In some embodiments, the reference can be inserted into or appended to the content item. For example, if a user creates a content item during a break in a sports game (e.g., half-time, seventh inning stretch, etc.), the event reference module 304 can insert into the content item a reference indicating that the content item was created during the break. As another example, if a user creates a content item about an entertainment awards ceremony during a time when a particular award (e.g., best screenplay) is being presented during the ceremony, the event reference module 304 can append to the content item a reference indicating that the content item was created during presentation of the award.

Figure 4:
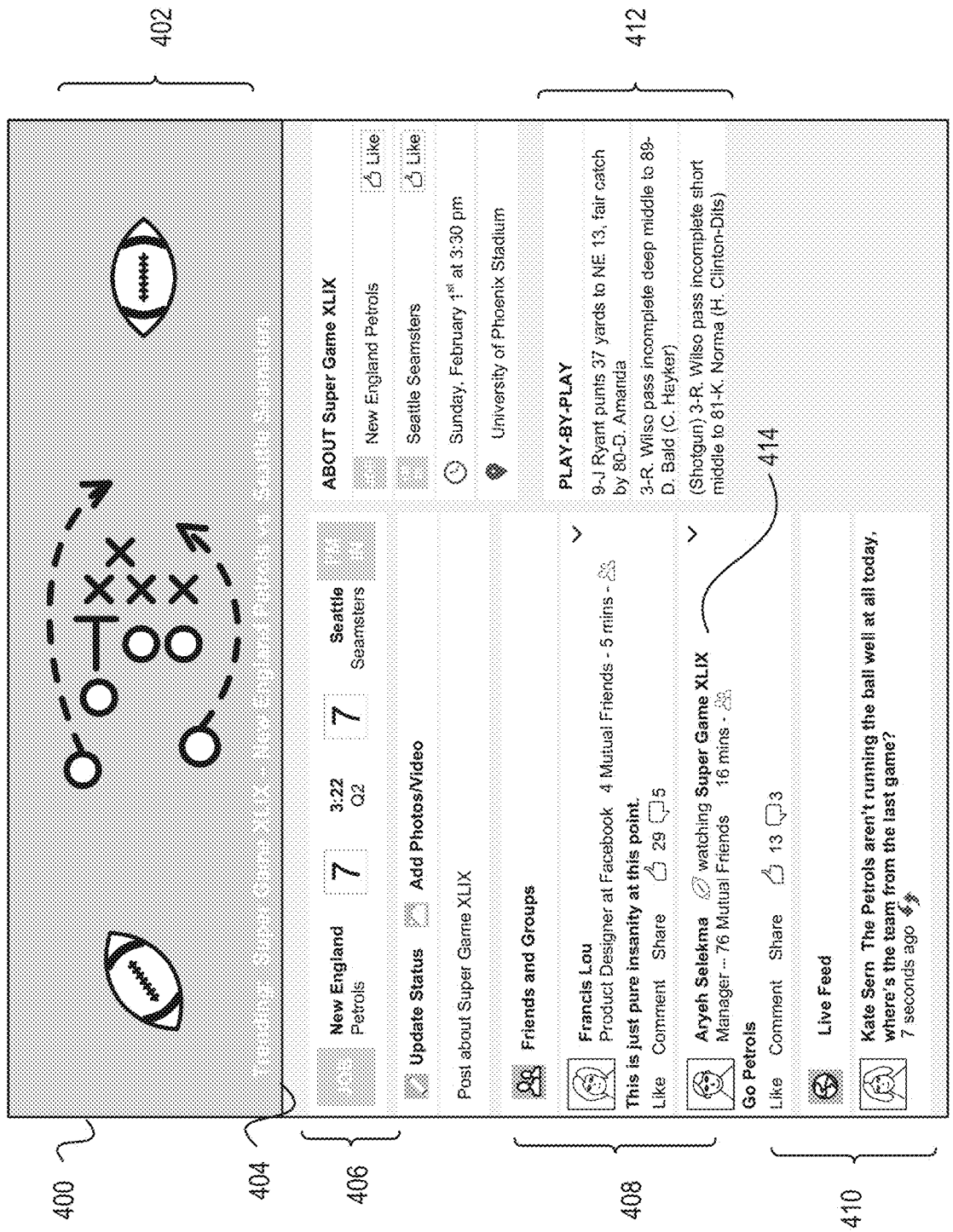
FIG. 4 illustrates an example page of a social networking system associated with an event, according to an embodiment of the present disclosure.

FIG. 4 illustrates an example screen of a page 400 of a social networking system associated with an event and presented to a user, according to an embodiment of the present disclosure. In the example shown, the page 400 relates to an event that is a sports game. Other events are possible. The page 400 includes an image 402, such as a primary or cover image for the event. The image 402 can change as the event transpires. In some embodiments, the image 402 can change to reflect contemporaneous activities of the event as the event transpires. In some embodiments, a plurality of images that can be sequentially presented as the image 402 can be selected by an administrator of the social networking system, an organization that manages the event, or both in collaboration. A title 404 for the page 400 or the image 402 can provide a description of the event or a particular time or activity of the event as the event transpires. A section 406 can provide live data about the sports game, such as a current score of the game. The live data about the game can be provided by a source, other than the social networking system, that is in communication with the social networking system. A section 408 can be personalized for the user and can present content items generated by connections or groups of the user. The content items can be sorted and ranked based on a variety of considerations, such as the affinity of the connections or groups with the user, the extent to which the content items have been determined to relate to the page 400, and the number of likes received, as discussed herein. A section 410 can provide content items reflecting subject matter related to the page 400 as a live feed. The live feed presented in the section 410 can be implemented to provide various categories of trending information related to the page 400. The content items of the live feed presented in the section 410 can include content items having a public privacy setting so that all users who visit the page 400 can view the content items. A section 412 provides summaries of segments of the sports game and, in particular, a "play-by-play" account of the sports game as the game transpires. For other types of events, the "play-by-play" label for the section 412 and other fields of information in the page 400 can be modified to match the type of event. A post 414 by a connection of the user includes pre-populated information (e.g., a thought or sentiment) about an activity of the connection in relation to the event. In the example shown, the pre-populated information is a statement that the connection is "watching Super Game XLIX". The statement can allow the post to be associated with the page 400 and can provide relevant information about the connection for the audience of the post 414. The post 414 also reflects selection by the connection of an indication to personalize the post 414 and, in particular, the selection by the connection of a football icon to reflect the interest of the connection in football. In other embodiments, the connection can select an icon that is specifically associated with a team that the connection is supporting in the sports game.

Other features can be included in the page 400. In some embodiments, a section can be included in the page 400 to provide content items generated by or otherwise related to participants in the event, as discussed in more detail herein. For example, content items generated by team players and coaches who are engaged in the sports game can be presented in a dedicated section of the page 400. These content items can be generated before, during, or after the event. In some embodiments, a content item, including but not limited to one of the content items presented in the section 408 and the section 410, can be appended with a reference to the event. The reference can relate generation of the content item to a contemporaneous time or activity associated with the event, as discussed in more detail herein.

Figure 5:
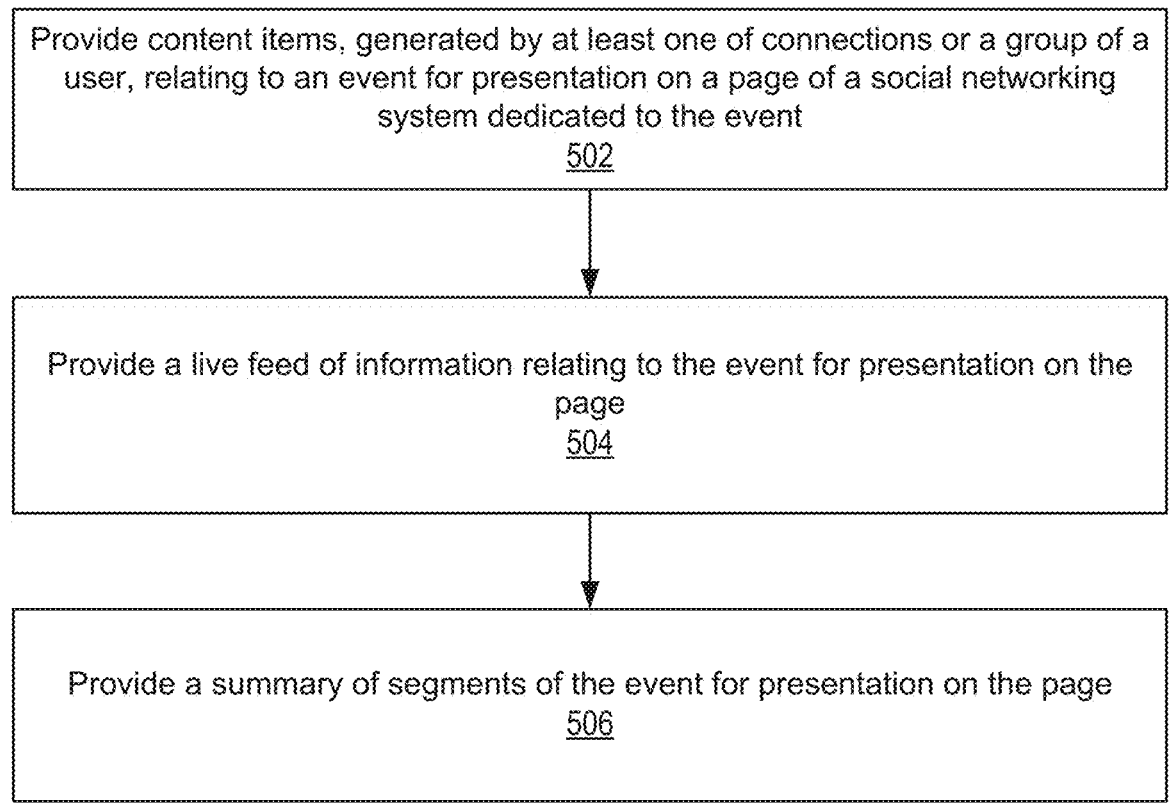
FIG. 5 illustrates a first method to manage a page associated with an event, according to an embodiment of the present disclosure.

FIG. 5 illustrates an example method 500 to manage a page on a social networking system associated with an event, according to an embodiment of the present disclosure. It should be appreciated that there can be additional, fewer, or alternative steps performed in similar or alternative orders, or in parallel, in accordance with the various embodiments and features discussed herein unless otherwise stated.

At block 502, the method 500 can provide content items, generated by at least one of connections or a group of a user, relating to an event for presentation on a page of a social networking system dedicated to the event. At block 504, the method 500 can provide a live feed of information relating to the event for presentation on the page. At block 506, the method 500 can provide a summary of segments of the event for presentation on the page. Other suitable techniques that incorporate various features and embodiments of the present disclosure are possible.

FIG. 5A illustrates an example method 550 to manage a page on a social networking system associated with an event, according to an embodiment of the present disclosure. It should be appreciated that there can be additional, fewer, or alternative steps performed in similar or alternative orders, or in parallel, in accordance with the various embodiments and features discussed herein unless otherwise stated.

At block 552, the method 550 can provide content items, generated by at least one of connections or a group of a user, relating to an event for presentation on a page of a social networking system dedicated to the event. At block 554, the method 550 can provide a plurality of options to the user to personalize a post of the user to indicate an expression of support by the user for at least one aspect of the event. At block 556, the method 550 can pre-populate information in a post of the user regarding an activity of the user in relation to the event. At block 558, the method 550 can append a reference to a post of the user related to the event indicating at least one of a time of the event and an activity of the event that is contemporaneous with generation of the post. Other suitable techniques that incorporate various features and embodiments of the present disclosure are possible.

Social Networking System—Example Implementation

Figure 6:
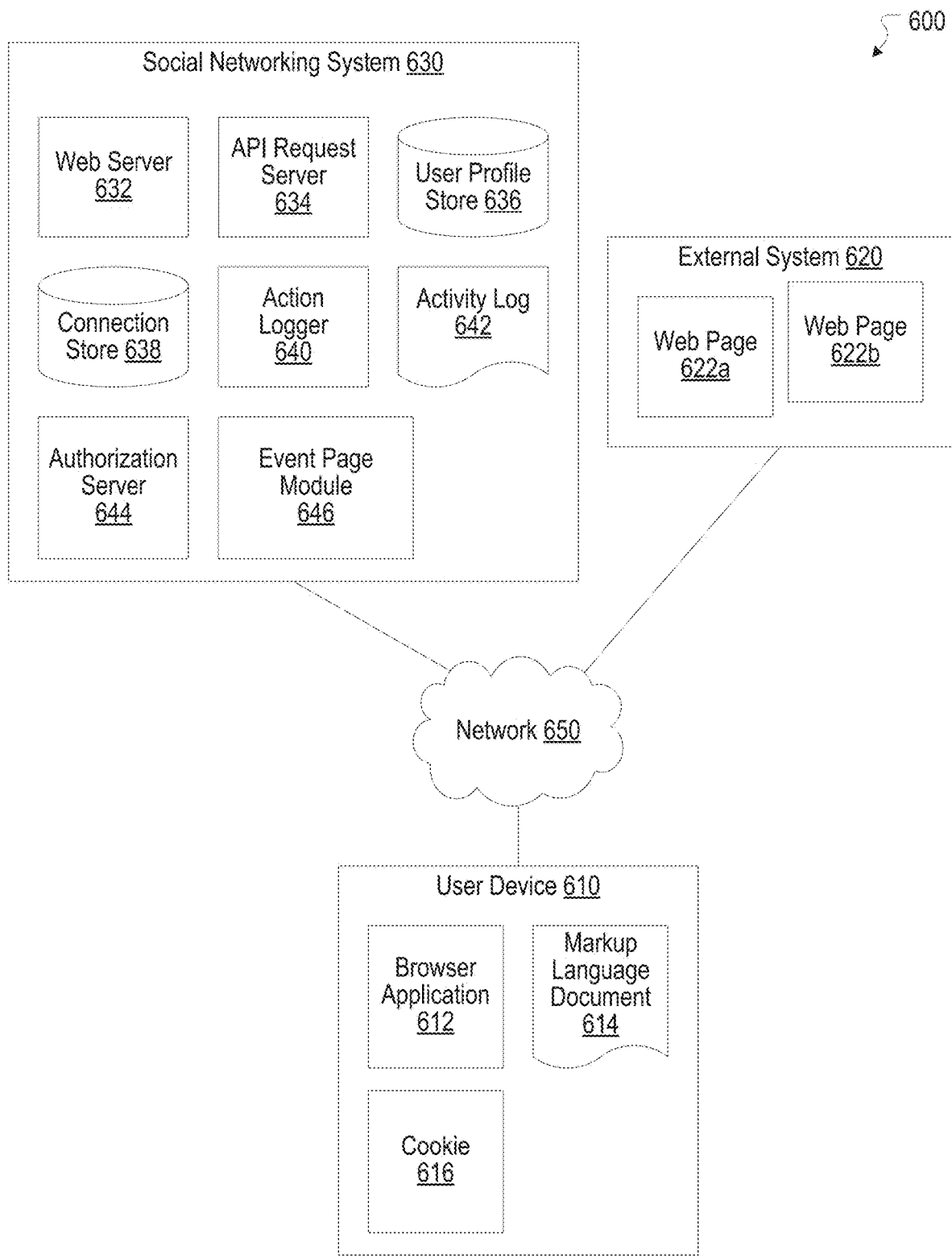
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an event page module 646. The event page module 646 can be implemented with the event page module 102, as discussed in more detail herein. In some embodiments, one or more functionalities of the event page module 646 can be implemented in the user device 610.

Hardware Implementation

Figure 7:
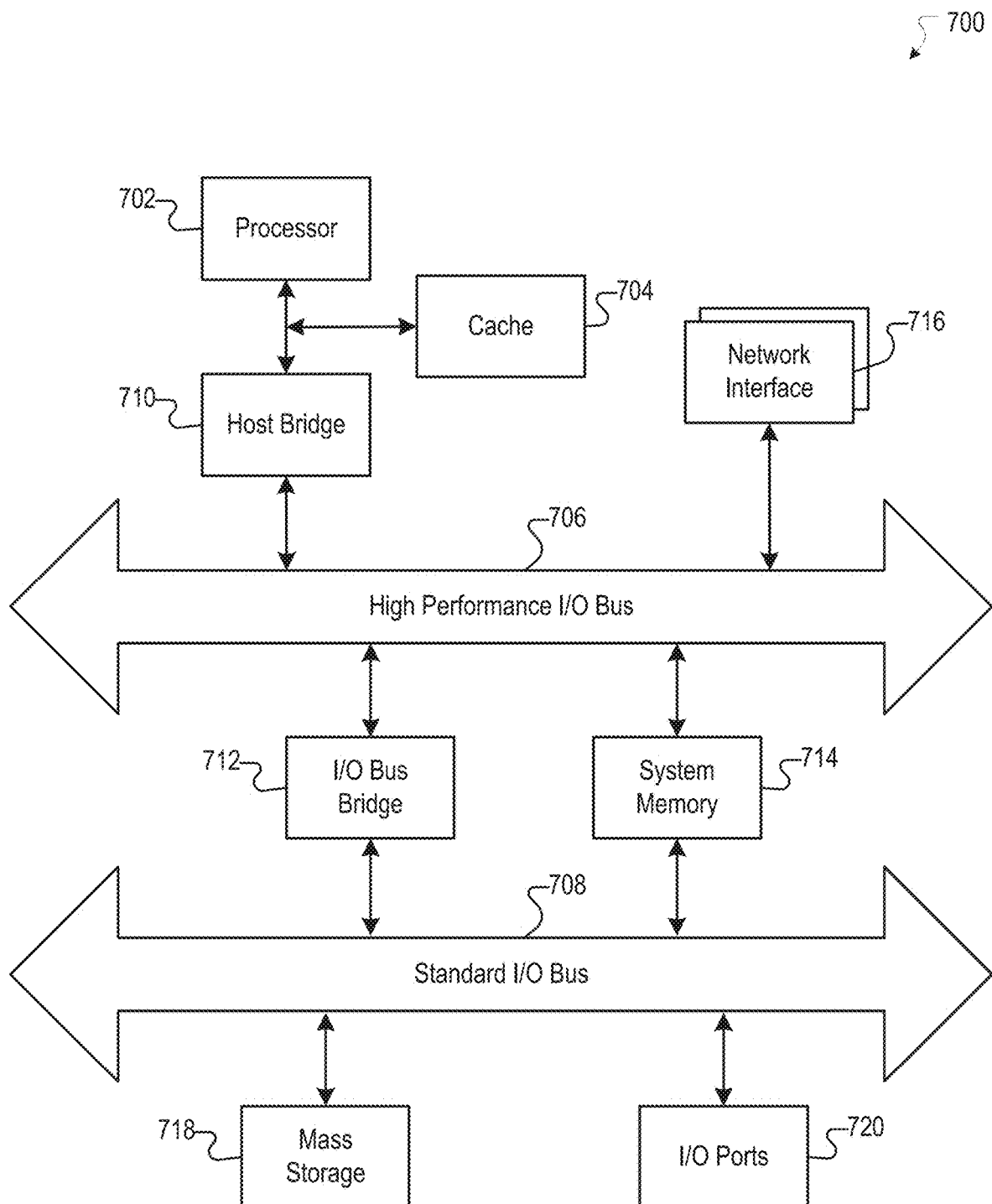
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   providing, by a computing system, content items, generated by at least one of connections or a group of a user, relating to an event for presentation in a first section of a page of a social networking system dedicated to the event, wherein the content items are ranked for presentation based on at least one of an affinity between a connection who generated a content item and the user, an affinity between a group that generated a content item and the user, and a value reflecting an extent to which a content item is associated with the event;
   providing, by the computing system, a plurality of options to the user to personalize a post of the user to indicate an expression of support by the user for the event, wherein the post includes a narrative;
   providing, by the computing system, a live feed of information relating to the event for presentation in a second section of the page, wherein the live feed comprises content items organized and presented by categories, the categories comprising authorities, eyewitness communications, eyewitness media, and metadata;
   providing, by the computing system, a summary of segments of the event for presentation on the page, wherein the segments include portions of the event based on intervals of time or occurrence of certain activities; and
   appending, by the computing system, a reference to the post of the user related to the event indicating an activity of the event that is contemporaneous with generation of the post.

2. The computer-implemented method of claim 1, wherein the event relates to at least one of a sports activity, an entertainment activity, a political activity, and a social activity.

3. The computer-implemented method of claim 1, wherein the event occurs in at least one of real life or the social networking system.

4. The computer-implemented method of claim 1, further comprising:
   providing content items generated by participants in the event for presentation on the page.

5. The computer-implemented method of claim 1, further comprising:
   receiving live data of the live feed from a third party source in communication with the social networking system.

6. The computer-implemented method of claim 1,
   wherein the plurality of options include a plurality of icons selectable by the user for display in the post of the user, wherein the post is published to users of the social networking system displaying at least one icon selected from the plurality of icons.

7. The computer-implemented method of claim 1, further comprising:
   pre-populating information in a post of the user regarding an activity of the user in relation to the event.

8. The computer-implemented method of claim 1, further comprising:
   appending a reference to a post of the user related to the event indicating a time of the event.

9. The computer-implemented method of claim 1, further comprising:
   associating each image of a plurality of images with a corresponding activity of the event; and
   providing each image of the plurality of the images contemporaneously with the occurrence of each activity of the event as the event transpires.

10. The computer-implemented method of claim 9, wherein the plurality of images is selected by at least one of an administrator of the social networking system and an organization that manages the event.

11. A system comprising:
    at least one processor; and
    a memory storing instructions that, when executed by the at least one processor, cause the system to perform:
    providing content items, generated by at least one of connections or a group of a user, relating to an event for presentation in a first section of a page of a social networking system dedicated to the event, wherein the content items are ranked for presentation based on at least one of an affinity between a connection who generated a content item and the user, an affinity between a group that generated a content item and the user, and a value reflecting an extent to which a content item is associated with the event;

providing a plurality of options to the user to personalize a post of the user to indicate an expression of support by the user for the event, wherein the post includes a narrative;

providing a live feed of information relating to the event for presentation in a second section of the page, wherein the live feed comprises content items organized and presented by categories, the categories comprising authorities, eyewitness communications, eyewitness media, and metadata;

providing a summary of segments of the event for presentation on the page, wherein the segments include portions of the event based on intervals of time or occurrence of certain activities; and appending a reference to a post of the user related to the event indicating an activity of the event that is contemporaneous with generation of the post.

12. The system of claim 11, wherein the event relates to at least one of a sports activity, an entertainment activity, a political activity, and a social activity.

13. The system of claim 11, further comprising:
providing content items generated by participants in the event for presentation on the page.

14. The system of claim 11,
wherein the plurality of options include a plurality of icons selectable by the user for display in the post of the user, wherein the post is published to users of the social networking system displaying at least one icon selected from the plurality of icons.

15. The system of claim 11, further comprising:
appending a reference to a post of the user related to the event indicating a time of the event.

16. A non-transitory computer-readable storage medium including instructions that, when executed by at least one processor of a computing system, cause the computing system to perform a method comprising:
providing content items, generated by at least one of connections or a group of a user, relating to an event for presentation in a first section of a page of a social networking system dedicated to the event, wherein the content items are ranked for presentation based on at least one of an affinity between a connection who generated a content item and the user, an affinity between a group that generated a content item and the user, and a value reflecting an extent to which a content item is associated with the event;

providing a plurality of options to the user to personalize a post of the user to indicate an expression of support by the user for the event, wherein the post includes a narrative;

providing a live feed of information relating to the event for presentation on the page, wherein the live feed comprises content items organized and presented by categories, the categories comprising authorities, eyewitness communications, eyewitness media, and metadata;

providing a summary of segments of the event for presentation in a second section of the page, wherein the segments include portions of the event based on intervals of time or occurrence of certain activities; and appending a reference to a post of the user related to the event indicating an activity of the event that is contemporaneous with generation of the post.

17. The computer-implemented method of claim 1, further comprising:
providing content items generated by participants in the event for presentation in a third section of the page.

18. The computer-implemented method of claim 1, further comprising:
changing a cover image of the page to reflect contemporaneous activities of the event as the event transpires.

19. The computer-implemented method of claim 1, wherein a link to the page is published to users of the social networking system.

20. The computer-implemented method of claim 1, wherein the live feed includes trending stories about the event.

* * * * *